(12) United States Patent
Deluca et al.

(10) Patent No.: US 11,062,282 B2
(45) Date of Patent: *Jul. 13, 2021

(54) SYSTEM AND METHOD FOR PROVIDING A PORTABLE ATM

(71) Applicant: Capital One Services, LLC, McLean, VA (US)

(72) Inventors: Brian Deluca, Midlothian, VA (US);
Harish Chavan, Glen Allen, VA (US);
Jamie Warder, Bethesda, MD (US);
Max Doerfler, Richmond, VA (US);
William Grisaitis, Arlington, VA (US);
Mayank Pande, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/267,046

(22) Filed: Feb. 4, 2019

(65) Prior Publication Data
US 2019/0180259 A1 Jun. 13, 2019

Related U.S. Application Data

(63) Continuation of application No. 14/854,404, filed on Sep. 15, 2015, now Pat. No. 10,198,721.
(Continued)

(51) Int. Cl.
*G06Q 40/00* (2012.01)
*G06Q 20/10* (2012.01)
(Continued)

(52) U.S. Cl.
CPC ............ *G06Q 20/1085* (2013.01); *G01S 5/02* (2013.01); *G01S 19/13* (2013.01); *G06Q 20/322* (2013.01);
(Continued)

(58) Field of Classification Search
CPC .................................................. G06Q 20/1085
See application file for complete search history.

(56) References Cited

U.S. PATENT DOCUMENTS 4,861,049 A * 8/1989 Losi .................... G07F 19/20
280/47.16
5,726,430 A * 3/1998 Ruggirello ............... B60P 3/03
235/379

(Continued)

FOREIGN PATENT DOCUMENTS

WO 2016010884 A1 1/2016
WO WO-2016010884 A1 * 1/2016 ......... G06Q 20/4014

*Primary Examiner* — Mike Anderson
(74) *Attorney, Agent, or Firm* — Troutman Pepper Hamilton Sanders LLP; Christopher J. Forstner; John A. Morrissett

(57) ABSTRACT

Embodiments include a database that maintains a respective status of mobile ATMs that indicates the location and cash available for withdrawal, a communication interface that receives a request for a mobile ATM from a user device, the request including user device location data, a location processor that compares the user device location data to location data of the mobile ATMs, and determines a first mobile ATM that is closest to the user device based on the user device location data, and a backend transaction processor that processes the transaction when confirmed. The communication interface transmits an alert that includes the request to the first mobile ATM, receives a response, transmits another alert that includes the location of the first mobile (Continued)

ATM and an estimated time that the first mobile ATM will arrive at the location associated to the user device, and receives confirmation from the first mobile ATM.

19 Claims, 4 Drawing Sheets

Related U.S. Application Data

(60) Provisional application No. 62/050,353, filed on Sep. 15, 2014.

(51) Int. Cl.
　　*G07F 19/00*　　　(2006.01)
　　*G06Q 20/32*　　　(2012.01)
　　*G01S 5/02*　　　　(2010.01)
　　*G01S 19/13*　　　 (2010.01)
　　*H04W 4/021*　　　(2018.01)

(52) U.S. Cl.
　　CPC ......... *G06Q 20/3224* (2013.01); *G07F 19/20* (2013.01); *G07F 19/201* (2013.01); *G07F 19/205* (2013.01); *G07F 19/211* (2013.01); *H04W 4/021* (2013.01)

(56) References Cited

U.S. PATENT DOCUMENTS

| | | | |
|---|---|---|---|
| 9,290,927 B1* | 3/2016 | Sheley | G07F 19/205 |
| 2002/0074394 A1* | 6/2002 | Birnie | G07F 19/201 |
| | | | 235/379 |
| 2010/0059587 A1* | 3/2010 | Miller | G06Q 20/4014 |
| | | | 235/379 |
| 2011/0238514 A1* | 9/2011 | Ramalingam | G06Q 20/10 |
| | | | 705/21 |
| 2012/0041675 A1* | 2/2012 | Juliver | G06Q 30/0283 |
| | | | 701/465 |
| 2014/0047413 A1* | 2/2014 | Sheive | G06F 8/30 |
| | | | 717/110 |
| 2014/0351125 A1* | 11/2014 | Miller | G06Q 20/1085 |
| | | | 705/43 |
| 2015/0356834 A1* | 12/2015 | Smith | E05G 1/024 |
| | | | 109/24 |
| 2016/0012403 A1* | 1/2016 | Kursun | G06Q 20/1085 |
| | | | 705/44 |
| 2016/0012411 A1* | 1/2016 | Kursun | G06Q 40/02 |
| | | | 705/42 |

* cited by examiner

SYSTEM AND METHOD FOR PROVIDING A PORTABLE ATM

CROSS REFERENCE TO RELATED APPLICATIONS

This application is a continuation of, and claims priority to, U.S. patent application Ser. No. 14/854,404, entitled "System and Method for Providing a Portable ATM," filed Sep. 15, 2015, which claims the benefit of U.S. Provisional Application No. 62/050,35, filed on September 15, the entire contents of these applications are incorporated herein by reference.

This application contains subject matter related to Provisional Application No. 61/924,392, filed on Jan. 7, 2014, Provisional Application No. 61/976,703, filed on Apr. 8, 2014, and Provisional Application No. 62/000,666, filed on May 20, 2014, the contents of which are incorporated by reference herein in their entirety.

FIELD OF THE DISCLOSURE

The present disclosure relates to systems and methods for providing mobile ATM services to a customer.

BACKGROUND OF THE DISCLOSURE

Currently, if an individual wishes to obtain cash, that individual must find a physical automatic teller machine (ATM), cash dispenser, or store to withdraw cash. The availability of cash is limited by the availability of nearby ATMs, cash dispensers, and stores, as well as bank branch hours. Furthermore, some ATMs charge unreasonable fees for cash withdrawals. Also, ATMs may be located in unsafe or remote areas, making it difficult for an individual to access cash when he or she needs it.

These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
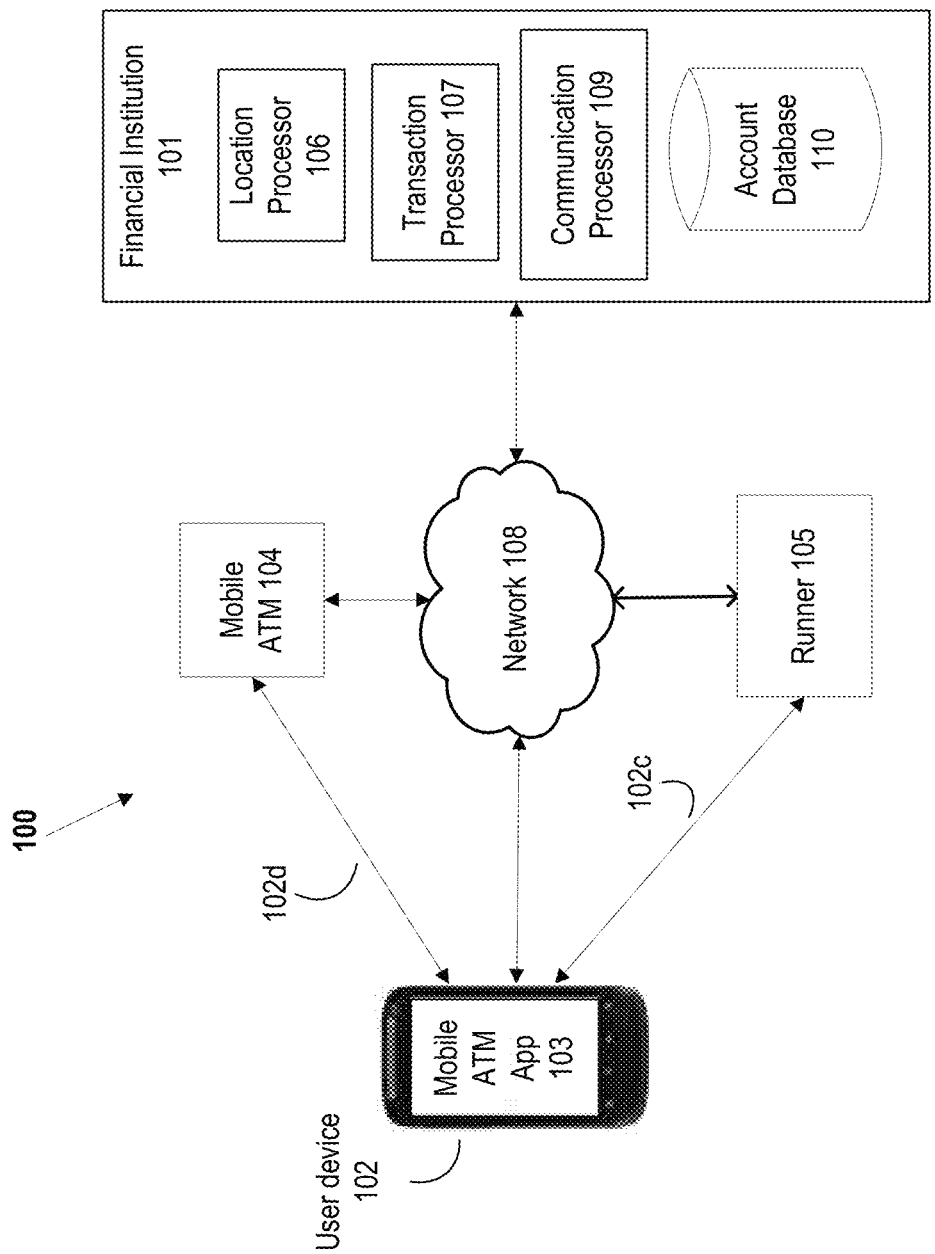
FIG. 1 depicts a schematic diagram of a system for providing a mobile ATM to a user in response to the user's request, according to an example embodiment of the disclosure.

The following description is intended to convey a thorough understanding of the embodiments described by providing a number of specific exemplary embodiments and details involving systems and methods for providing mobile ATMs to a customer in response to the customer's request. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only.

In various embodiments, a customer may access a mobile banking application on a mobile device and submit a request for a mobile ATM. Although the present disclosure describes the systems and methods used within a mobile banking application, it will be appreciated that a mobile optimized website and/or online banking website also may be used. The customer may request a withdrawal and/or deposit, and include the amount to be withdrawn/deposited. The customer request may include the customer's name, contact information, account number, and the current date and time. The request may include the customer's current location and/or a location where the customer would like to meet the mobile ATM. In various example embodiments, various location services on a mobile device may be used to determine the customer's location. For example, a mobile device may use information from cellular, Wi-Fi, Global Positioning System (GPS) networks and/or iBeacons or other similar devices to determine an approximate location. The mobile device may, for example, periodically send the geo-tagged location of nearby Wi-Fi hotspots and cell towers in an anonymous and/or encrypted form to an aggregator that may improve location accuracy. Where, for example, the mobile device is an Apple device (e.g., an iPhone, iPad, iPod, smart watch, etc.) the Core Location framework may be used to receive and monitor the current location of the mobile device. For example, a mobile banking application may link to Core Location framework in an Xcode project to enable the mobile banking application to locate the current position of the device. Where for example, the mobile device is running the Google Android platform, the ACCESS_COARSE_LOCATION and_FINE_strings may be used by the mobile banking application to obtain the location of the mobile device.

The request, which may include location information, may be transmitted over a network to one or more servers, which may locate a nearby mobile ATM that is proximate to the customer's current location (e.g., using similar techniques as described herein). The mobile ATM may be a vehicle-based ATM. The one or more servers may notify the vehicle-based ATM of the customer's request, and a response may be sent to the customer's mobile device. The response may include a unique identifier for the vehicle-based ATM, an estimated arrival time, the ATM's current location. The response may include a tracker, allowing the customer to track the location of the vehicle-based ATM. The vehicle-based ATM may be driven to the customer's location (or a nearby location), and the customer may receive an alert when the ATM has arrived. The customer may then withdraw and/or deposit cash at the vehicle-based ATM.

In various embodiments, a customer may access a mobile banking application on a mobile device and submit a request for a mobile ATM. The customer may request a withdrawal or deposit, and include the amount to be withdrawn/deposited. The customer request may include the customer's name, contact information, account number, and the current date and time. The request may include the customer's current location and/or a location where the customer would like to meet the mobile ATM. The request also may be transmitted over a network to one or more servers, which may locate a nearby runner who is equipped with an amount of cash. The runner may be proximate to the customer's current location. The runner may be equipped with a vehicle and a mobile device. The one or more servers may notify the runner of the customer's request, and a response may be sent to the customer's mobile device. The response may include a unique identifier for the runner, an estimated arrival time, and the runner's current location. The runner may arrive at the customer's location (or a nearby location), and the customer may receive an alert when the runner has arrived. The customer may receive (withdraw) or provide (deposit) the cash to the runner, and the runner may confirm the transaction. The financial institution may have set up a temporary account for transfers associated with the ATM application. The financial institution may execute a transaction by debiting/crediting the customer's account to the temporary account in the amount of the withdrawal/deposit upon receiving a confirmation from the runner and/or the customer that the transaction has taken place.

FIG. 1 depicts an exemplary embodiment of a system 100 for providing a mobile ATM to a customer in response to the customer's request, according to various embodiments of the disclosure. The system 100 may include various network-enabled computer systems, including, as depicted in FIG. 1 for example, a financial institution 101 (comprising location processor 106, transaction processor 107, communication processor 109, and account database 110), user device 102, mobile ATM 104, runner system 105, and network 108. It is also noted that the system 100 illustrates only a single instance of each component. It will be appreciated that multiple instances of these components may be used. For example, various embodiments may include a plurality of user devices 102, mobile ATMs 104, and/or runner systems 105. Moreover, the system 100 may include other devices not depicted in FIG. 1.

In various example embodiments, location processor 106, transaction processor 107, communication processor 109, and/or account database 110 may be stand-alone components, or combined separately from financial institution 101. Each processor may comprise one or more network-enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications, such as mobile ATM application 103, to enable a user of user device 102 to request a mobile ATM 104 and/or a runner system 105 from financial institution 101. In various embodiments, mobile ATM application 103 may be integrated into a native mobile banking application and/or a mobile optimized web site associated with financial institution 101, for example. The functionality of mobile ATM application 103 also may be integrated into an online banking website.

The components depicted in FIG. 1 may store information in various electronic storage media, such as account database 110. Electronic information, files, and documents may be stored in various ways, including, for example, a flat file, indexed file, hierarchical database, relational database, such as a database created and maintained with software from, for example, Oracle® Corporation, a Microsoft® SQL system, an Amazon cloud hosted database or any other query-able structured data storage mechanism.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal. Network 108 may comprise one or more secure communication channels for securely exchanging information between requestor device 102a, dispenser device 102b, and financial institution 101.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the exemplary types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

In various example embodiments, user device 102 may be associated with any individual or entity that desires to withdraw cash and/or deposit cash using an ATM associated with financial institution 101. Financial institution 101 may be, for example, a bank, other type of financial institution, including a credit card and/or debit card provider, for example, or any other entity that offers accounts to customers. An account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, an account or service that links to an underlying payment account already described, or mobile commerce account. An account may or may not have an associated card, such as, for example, a credit card for a credit account or a debit card for a debit account. The account may enable payment using biometric authentication, or contactless based forms of authentication, such as QR codes or near-field communications. The account card may be associated or affiliated with one or more social networking sites, such as a co-branded credit card.

User device 102 may be, for example, a handheld PC, a phone, a smartphone, a PDA, a tablet computer, or other device. User device 102 may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device (e.g., smart watch). Device 102 may include device-to-device communication abilities (shown as elements 102c and 102d). Elements 102c and 102d may include RFID transmitters and receivers, cameras, scanners, and/or Near Field Communication (NFC) capabilities, which may allow for communication with other devices by touching them together or bringing them into close proximity. Exemplary NFC standards include ISO/IEC 18092:2004, which defines communication modes for Near Field Communication Interface and Protocol (NFCIP-1). For example, device 102 may be configured using the Isis Mobile Wallet™ system, which is incorporated herein by reference. Other exemplary NFC standards include those created by the NFC Forum. Elements 102c and 102d may use Bluetooth technology built into device 102. Elements 102c and 102d may use iBeacon technology and/or Bluetooth Low Energy (BLE) capabilities.

User device 102 may include one or more software applications, such as mobile ATM application 103. Mobile ATM application 103 may be a software application that enables user device 102 to securely exchange data with, network 108, financial institution 101, mobile ATM 104, runner system 105, location processor 106, transaction processor 107, communication processor 109, and/or account database 110. Mobile ATM application 103 may provide one or more graphical user interfaces for the users of device 102 to locate a mobile ATM 104 and/or runner system 105 and withdraw or deposit cash. Mobile ATM application 103 may be, for example, a native application that executes on a mobile device. Mobile ATM application 103 may also be integrated into, for example, a native mobile banking application and/or mobile optimized web site that allows the user of user device 102 to access an account with financial institution 101.

The user of device 102 may have one or more accounts with financial institution 101. The user of device 102 may use Mobile ATM application 103 to link his account to transaction processor 107 and allow transaction processor 107 to use the account for digital payments in exchange for the user being able to receive cash from runner system 105 and/or deposit cash with runner system 105. The user of user device 102 may log into his online account via mobile ATM application 103. The login may include a username and password. Transaction processor 107 may receive the username and password over network 108 and compare them to login information associated with accounts stored in database 110. If a match is found, transaction processor 107 may grant the user access to his account (or accounts) in account database 110 via mobile ATM application 103.

The user may select a "Mobile ATM" feature on, for example, the interface provided by mobile ATM application 103. The user may desire to withdraw and/or deposit cash using a mobile ATM and/or a runner associated with financial institution 101. Mobile ATM application 103 may provide an interface to user device 102 allowing the user to make a request for a withdrawal/deposit. Mobile application 103 may query the user whether he wants to withdraw cash or deposit cash. If the user selects "withdraw cash", mobile application 103 may prompt the user to enter the amount he wishes to withdraw. If the user selects "deposit cash", mobile application 103 may prompt the user to enter the amount he wishes to deposit. In various embodiments, mobile ATM application 103 may query the user whether he wants a mobile ATM or a runner. The user may specify one or the other, or both. In various embodiments, transaction processor 107 may automatically only search for mobile ATMs based on the amount of the requested withdrawal/deposit. For example, if the withdrawal/deposit amount exceeds $500, transaction processor 107 may automatically limit the search to mobile ATMs. The user may include a time window for meeting the mobile ATM and/or runner (e.g., the user may request a mobile ATM within the next 30 minutes).

Mobile ATM 104 may be an automatic-teller machine and/or cash dispenser and/or the like that is vehicle-based. Mobile ATM 104 may be associated with financial institution 101. Mobile ATM 104 may comprise a vehicle that is outfitted with a portable ATM. The ATM may be integrated into the vehicle. Mobile ATM 104 may be a truck or a van or other similar moving vehicle. Mobile ATM 104 may be driven by an employee of financial institution 101. Mobile ATM 104 may maintain a secure connection with financial institution 101, location processor 106, transaction processor 107, communication processor 109, and/or account database 110. A user may be able to approach mobile ATM 104 and physically deposit or withdraw cash from mobile ATM 104 in the same way the user would using a stationary ATM or cash dispenser, for example. Deposits and withdrawals at mobile ATM 104 may be reconciled with accounts associated with financial institution 101 on a regular basis in the same way that deposits and withdrawals at a stationary ATM would be.

Runner system 105 may be an individual who is associated with financial institution 101. The individual may be an employee. Runner system 105 may have a mobile device (similar to user device 102) to communication with financial institution 101, user device 102, location processor 106, transaction processor 107, communication processor 109, and/or account database 110. Runner system 105 may be equipped to withdraw cash from an account associated with financial institution 101 (as will be described in detail below). Runner system 105 may have a vehicle. Runner system 105 may have one or more devices to securely carry cash to a user associated with user device 102 (e.g., a miniature, portable vault).

Financial institution 101 may receive the request from user device 102. The request may include the name of the user associated with user device 102. The request may include a contact number associated with user device 102. The request may include the amount of the withdrawal/deposit. The request may include whether the user wants a mobile ATM or a runner. The request may include location data from user device 102. The request may include a time window and/or time of day when the user would like to meet the mobile ATM or runner. The location data may be GPS coordinates and/or a physical address indicating the current location of user device 102. The location data may be GPS coordinates and/or a physical address indicating the location where the user of user device 102 would like to receive cash.

For example, the user may indicate that he wants to meet the mobile ATM at a nearby Starbucks and provide the address for the Starbucks. The user may use the interface of mobile ATM application 103 to "drop a pin" (using a mobile device interface) at a location where he wants to meet the mobile ATM/runner. In various embodiments, location processor 106 may automatically pull location data from user device 102 (using, for example, the hardware and software described above) in response to financial institution 101 receiving a request for a mobile ATM from user device 102. The request may include account information associated with one or more accounts held by the user of user device 102 at financial institution 101. The account information may include an account number, routing number, etc.

Location processor 106 may search for mobile ATMs 104 and/or runners 105 that are within a certain distance of the location associated with the location data from user device 102. Location processor 106 may constantly receive updated location data from mobile ATM 104 and/or runner system 105. Location processor 106 may search for a mobile ATM 104 that is closest to the location data from user device 102 by comparing location data from user device 102 with location data from mobile ATM 104. Location processor 106 may search for runner system 105 that is closest to the location data from user device 102 by comparing the location data from user device 102 with location data from runner system 105. If the customer specifically requested a mobile ATM, location processor 106 may only search for mobile ATMs (such as mobile ATM 104), and not runners (such as runner system 105). If the customer's requested amount for withdrawal/deposit exceeds a predetermined limit (e.g., $500), location processor 106 may only search for mobile ATMs (such as mobile ATM 104), and not runners (such as runner system 105).

In one embodiment, location processor 106 may search for runners and mobile ATMs that are within a predetermined distance of the location data from user device 102. The predetermined distance may be based on the location of user device 102. For example, if user device 102 is in a rural area, the predetermined distance may be larger (e.g., 20 miles) than if user device 102 is in an urban area (where the predetermined distance may be 5 miles based on the assumption that there are more mobile ATMs and runners in the urban area). The predetermined distance also may be based on time to travel to user device 102, which may, for example, factor in traffic time and other external factors. Location processor 106 may compare the time window in the request with an estimated time it would take for the mobile ATM/runner to reach the customer location.

In one example, location processor 106 may discover mobile ATM 104 is closest to user device 102, only 2 miles away. Communication processor 109 may transmit an alert to mobile ATM 104 that includes the request from user device 102. The alert may include the location data from user device 102, the amount of the requested withdrawal/deposit, and identification information associated with the user (e.g., a picture or photograph of the user). The driver or other employee associated with mobile ATM 104 may respond to the alert affirmatively, indicating that he will drive to the location associated with user device 102. The response may include an estimated time that it will take mobile ATM 104 to meet the user of user device 102. The estimated time may be automatically computed by location processor 106 based on the time of day, the traffic conditions, the road conditions, and the respective locations of mobile ATM 104 and the location data from user device 102. The driver of mobile ATM 104 may respond negatively, indicating that he will not be able to fulfill the request. If the driver responds negatively, location processor 106 may continue to search for another mobile ATM and/or runner. The driver may propose a different location, which may be sent to the user as an alert.

If the driver responds affirmatively, communication processor 109 may send an alert to user device 102 indicating that mobile ATM 104 will fulfill the request. The alert may include identifying information associated with mobile ATM 104 (e.g., a picture of the driver, the type of vehicle, the color, the license plate number, etc.). The alert may include the estimated time it will take mobile ATM 104 to arrive at the specified location. The alert may include the current location of mobile ATM 104. Mobile ATM application 103 may allow the user of user device 102 to track the current location of mobile ATM 104 while the user waits for mobile ATM 104 to arrive. Communications processor 109 may allow user device 102 to exchange messages with mobile ATM 104. As used herein, a message and/or an alert may be in the form of a text message, SMS, MMS, Tweet (and/or other social media forms of communication), in-app message (e.g., a message within mobile ATM app 103), an email, a phone call, or other electronic form of communication.

When mobile ATM 104 arrives at the location specified by the user of user device 102, the user may interact with mobile ATM 104 to, for example, withdraw and/or deposit the cash. The user may use a card issued by financial institution 101 to use the mobile ATM in the same way the user would use the card at a stationary ATM. The user may present identification to the driver or other employee associated with mobile ATM 104. Following the transaction, the user may use mobile ATM application 103 to "rate" the transaction, the driver, the quality of service, etc.

In various embodiments, location processor 106 may discover runner system 105 is closest to user device 102, only 1 mile away. In this example, user device 102 may have requested only a runner. User device 102 also may have requested a mobile ATM 104, but based on the location information of mobile ATM 104, runner system 105 may be dispatched to serve the user of user device 102. Communication processor 109 may transmit an alert to runner system 105 that includes the request from user device 102. The alert may include the location data from user device 102, the amount of the requested withdrawal/deposit, and identification information associated with the user (e.g., a picture or photograph). Runner system 105 may respond to the alert affirmatively, indicating that runner system 105 will travel to the location associated with user device 102. The response may include an estimated time that it will take runner system 105 to meet the user of user device 102. The estimated time may be automatically computed by location processor 106 based on the time of day, the traffic conditions, the road conditions, and the respective locations of runner system 105 and the location data from user device 102. Runner system 105 may respond negatively, indicating that runner system 105 will not be able to fulfill the request. If runner system 105 responds negatively, location processor 106 may continue to search for another runner nearby the location associated with user device 102.

If runner system 105 responds affirmatively, communication processor 109 may send an alert to user device 102 indicating that runner system 105 will meet the user of user device 102. The alert may include identifying information associated with runner system 105 (e.g., a picture of the driver, the type of vehicle, the color, the license plate number, etc.). The alert may include the estimated time it will take runner system 105 to arrive at the specified location. The alert may include the current location of runner system 105. Mobile ATM application 103 may allow the user of user device 102 to track the current location of runner system 105 while the user waits for runner system 105 to arrive. Communications processor 109 may allow user device 102 to exchange messages with runner system 105.

Prior to arriving at the agreed-upon location, if the user request is a withdrawal request, runner system 105 may withdraw cash from an ATM associated with financial institution 101. If user device 102 requested a cash withdrawal, then runner system 105 may withdraw cash from an ATM that equals the amount in the withdrawal request from user device 102. In various embodiments, runner system 105 may withdraw a certain amount of cash on a regular basis from an ATM associated with financial institution 101 and carry it with him, regardless of whether he has received a withdrawal request from a user. The cash may be debited from an account maintained by transaction processor 107 and/or account database 110. The account may be specifically for a runner system that delivers cash withdrawals and receives deposits. The account may track the amount that each runner withdraws and/or deposits each day.

When the runner system 105 meets the user of user device 102, user device 102 and/or runner system 105 may confirm the transaction. User device 102 may engage in a person-to-person (P2P) transaction with runner system 105 (using exchange mechanism 102c, e.g., RFID, iBeacon, Bluetooth, NFC). User device 102 may provide a token to a device associated with runner system 105 (or vice versa). Upon receipt of the token, runner system 105 may transmit a confirmation signal to transaction processor 107. Upon receipt of a confirmation signal, the amount of the withdrawal may be automatically debited from an account associated with the user of user device 102 and credited to the test account. Runner system 105 may then provide the requisite cash to the user associated with user device 102. The P2P exchange may occur simultaneously with runner system 105 handing the cash to the user of user device 102. Example embodiments of Person2Person payments are disclosed in, for example, Appendix A, which is incorporated by reference herein in its entirety.

If the user request is a deposit request, when the runner system 105 meets the user of user device 102, user device 102 and/or runner system 105 may confirm the transaction. User device 102 may engage in a P2P transaction with runner system 105 (using exchange mechanism 102c). Upon receipt of a confirmation signal, the amount of the deposit may be automatically debited from the test account and credited to an account associated with the user of user device 102. Runner system 105 may then receive the equivalent cash from the user associated with user device 102. The P2P exchange may occur simultaneously with runner system 105 receiving the cash from the user of user device 102. Following this, runner system 105 may deposit the cash to the test account using an ATM associated with financial institution 101.

In various embodiments, multiple user devices may transmit a request for a mobile ATM and/or a runner. Each request may include location data associated with the user devices' requests. Location processor 106 may receive the multiple requests and determine a central location based on the location data associated with each request. Location processor 106 may find a runner system 105 and/or mobile ATM 104 that is closest to the central location and send an alert to determine whether the runner system 105 and/or mobile ATM 104 is available to travel to the central location and if the runner system 105 and/or mobile ATM 104 has cash available to meet the multiple requests. If the mobile ATM 104 and/or runner system 105 responds affirmatively, communications processor 109 may transmit an alert to each user device with the location data for the central location. The alert may include a message informing each user device to travel to the central location and be there at a certain time to meet the mobile ATM 104.

In various embodiments, location processor 106, transaction processor 107 and/or communication processor 109 may schedule a mobile ATM 104 and/or runner 105 to travel on a route that includes multiple customer locations based on receiving multiple customer requests. The route may be scheduled based on the amount of time each customer requests to receive the cash (e.g., location processor 106 may schedule mobile ATM 104 to meet customer A before customer B, where customer A would like cash in 10 minutes, while customer B would like cash in 15 minutes). Location processor 106 may update the route based on receiving a new customer request while the mobile ATM is in the process of following the route to meet other customers. If the customer location falls on the pre-determined route and he needs the cash when the vehicle is passing near him/her, location processor 106 can prioritize that customer.

In various embodiments, mobile ATM 104 and/or runner 105 may provide other banking services (e.g., check cashing, new debit card, cashier's check) in response to a request from user device 102. For example, the user associated with user device 102 may use mobile ATM application 103 to request a mobile ATM 104 to cash a check or receive a new debit card. The process for locating a mobile ATM and facilitating the interaction between the mobile ATM and the user device may be similar to the process described above.

In various embodiments, mobile ATM 104 and/or runner 105 may be an automated system (e.g., a driverless car). Mobile ATM 104 and/or runner 105 may communicate with location processor 106, transaction processor 107, and/or communication processor 109 via one or more network-enabled computers that are integrated with mobile ATM 104 and/or runner 105. The mobile ATM 104 and/or runner 105 may autonomously drive to a location to meet a customer, based on the process described above. When not in use, location processor 106, transaction processor 107, and/or communication processor 109 may direct the driverless car to a location that is associated with areas of high demand (based on past customer requests for mobile ATMs and/or runners).

Figure 2:
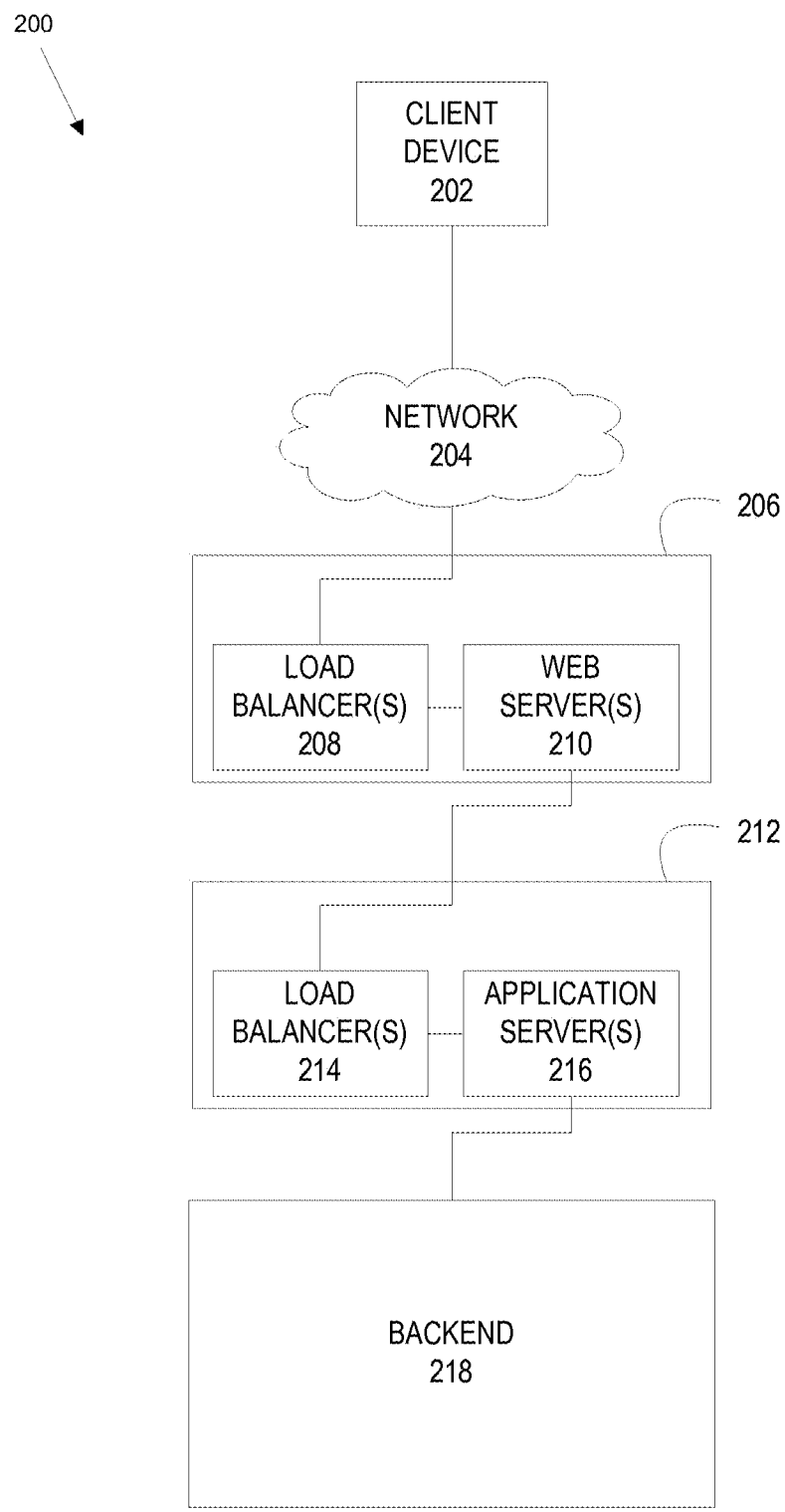
FIG. 2 depicts a schematic diagram of a system for providing a mobile ATM to a user in response to the user's request, according to an example embodiment of the disclosure.

FIG. 2 depicts an example system 200 that provides a mobile ATM to a user based on the user's request. As shown in FIG. 2, system 200 may include a client device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Client device 202 may be a network-enabled computer. Client device 202 may be similar to user device 102. Client device 202 may be configured to execute mobile ATM application 103. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Client device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 208 may distribute workloads across, for example, web server(S) 210 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 and 214 may include software that monitoring the port where external clients, such as, for example, client device 202, connect to access various services of a financial institution or third party that provides the mobile ATM services (such as system 100 shown in FIG. 1), for example. Load balancer(s) 208 may forward requests to one of the application servers 216 and/or backend 218 servers, which may then reply to load balancer 208. This may allow load balancer(s) 208 to reply to client device 202 without client device 202 ever knowing about the internal separation of functions. It also may prevent client devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device 202) through a network (e.g., network 204), such as the Internet. In various examples, web servers, may deliver web pages, relating to, for example, online banking applications and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from client device 202 so client device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200 and/or system 100, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 210 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution or other entity that maintains a distributes system similar to system 200 and/or system 100. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, a mobile ATM system (e.g., system 100 shown in FIG. 1) and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200. Backend 218 may be associated with one or more servers that enable the various services provided by system 100.

Figure 3:
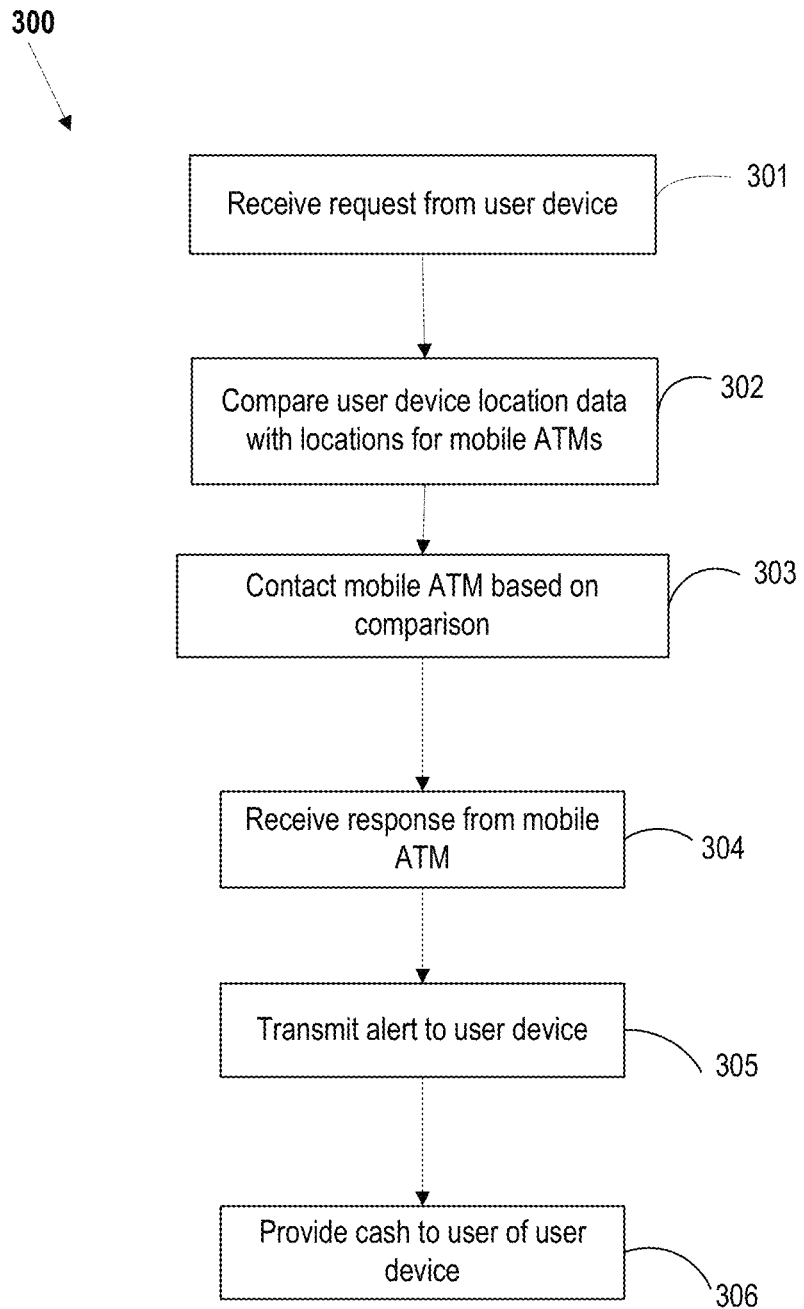
FIG. 3 depicts a schematic diagram of a method for providing a mobile ATM to a user in response to the user's request, according to an example embodiment of the disclosure.

FIG. 3 is a flow chart illustrating an example method for providing a mobile ATM in response to a user request. The method 300 shown in FIG. 3 can be executed or otherwise performed by one or more combinations of various systems. The method 300 as described below may be carried out by the system for providing a mobile ATM, as shown in FIGS. 1 and 2, by way of example, and various elements of that system are referenced in explaining the method of FIG. 3. Each block shown in FIG. 3 represents one or more processes, methods, or subroutines in the exemplary method 300. Referring to FIG. 3, the exemplary method 300 may begin at block 301.

At block 301, a request may be received from a user device. The request may be for a mobile ATM. The request may include location data from the user device, indicating a location where the user of the user device would like to meet the mobile ATM. The request may include an amount of cash that the user would like to withdraw or deposit. The request may include an account number for the user, a name, phone number, email address, and other identifying information for the user. The request may be received electronically over one or more networks. In one example, a user may request to withdraw $40 from a mobile ATM. The user may "drop a pin" at a location on a map interface where the user would like to meet the mobile ATM, and this location data may be provided with the request. The location data may be associated with a shopping mall near the user's house where the user is planning to shop after withdrawing the money. Method 300 may proceed to block 302.

At block 302, the location data from the request may be compared with the location data for one or more mobile ATMs. Each mobile ATM may be a vehicle-based ATM that is driven by an employee of the financial institution. The mobile ATM may regularly provide its current location to the financial institution. The financial institution may compare the current location of each mobile ATM within a certain radius of the location data indicated by the request. In this example, the financial institution may determine that the closest mobile ATM (in this example, "Vehicle 1") is 5 miles from the location of the shopping mall. Method 300 may proceed to block 303.

At block 303, the mobile ATM may be contacted based on the results of the comparison. In this example, the financial institution may send an alert to Vehicle 1. The alert may include the request from the user device. The alert may include the location of the shopping mall. The alert may query the driver/operator of Vehicle 1 to confirm that he can make it to the shopping mall and requesting an estimated time. The financial institution may automatically calculate the time it would take for Vehicle 1 to drive to the shopping mall, based on the distance between vehicle 1 and the shopping mall, the time of day, the current traffic conditions, the current weather, the vehicle type of vehicle 1, etc. Method 300 may proceed to block 304.

At block 304, a response may be received from vehicle 1. The response may be affirmative, indicating that Vehicle 1 will travel to the shopping mall to provide the cash to the user. The response may be negative, indicating that Vehicle 1 cannot make the trip. The response may propose a later time for vehicle 1 to arrive at the shopping mall (e.g., if Vehicle 1 has to make several stops along the way for other customers). In various embodiments, the operator/driver of the mobile ATM may respond with a proposed alternate location for meeting the user. In this example, Vehicle 1 may respond affirmatively and accept the request. The financial institution may calculate the estimated time for vehicle 1 to arrive at the shopping mall. Method 300 may proceed to block 305.

At block 305, an alert may be transmitted to the user device. The alert may include a picture of Vehicle 1, the estimated time of Vehicle 1's arrival at the shopping mall, a picture of the driver of vehicle 1, the license plate number of vehicle 1, a map-like interface that allows the user device to see vehicle 1's current location, and a messaging interface that allows user device to communicate directly with vehicle 1. Method 300 may proceed to block 306.

At block 306, the user of the user device may meet the mobile ATM and withdraw or deposit cash. In this example, the user meets vehicle 1 at the shopping mall and withdraws $40 in cash, in the same way he would using a stationary ATM at a bank.

Figure 4:
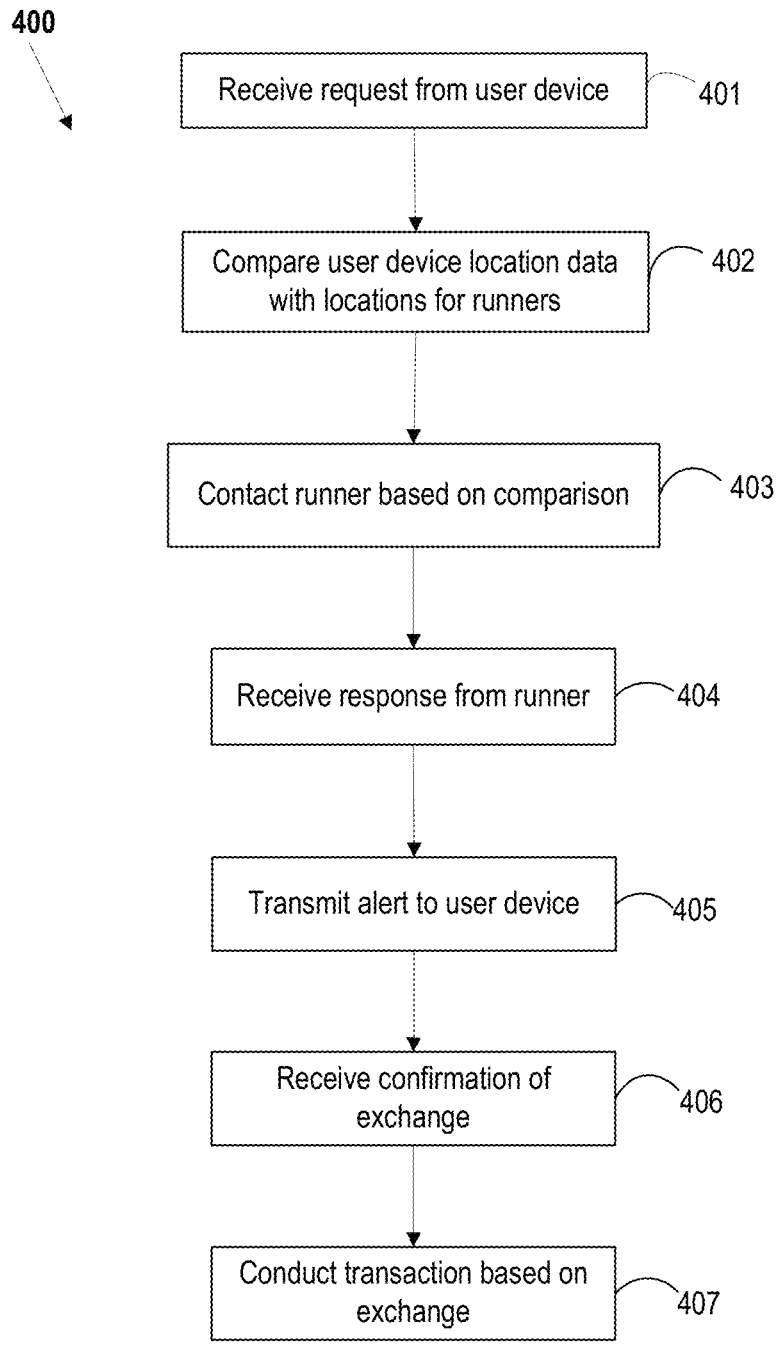
FIG. 4 depicts a schematic diagram of a method for providing a mobile ATM to a user in response to the user's request, according to an example embodiment of the disclosure.

FIG. 4 is a flow chart illustrating an example method for providing a runner in response to a user request. The method 400 shown in FIG. 4 can be executed or otherwise performed by one or more combinations of various systems. The method 400 as described below may be carried out by the system for providing a mobile ATM, as shown in FIGS. 1 and 2, by way of example, and various elements of that system are referenced in explaining the method of FIG. 4. Each block shown in FIG. 4 represents one or more processes, methods, or subroutines in the exemplary method 400. Referring to FIG. 4, the exemplary method 400 may begin at block 401.

At block 401, a request may be received from a user device. The request may be for a runner. The request may include location data from the user device, indicating a location where the user of the user device would like to meet the runner. The request may include an amount of cash that the user would like to withdraw or deposit. The request may include an account number for the user, a name, phone number, email address, and other identifying information for the user. The request may be received electronically over one or more networks. In one example, a user may request to deposit $60 with a runner. The user device may provide location data for the user's current location. The user may be at home and unable to go to a nearby ATM. Method 400 may proceed to block 402.

At block 402, the location data from the request may be compared with the location data for one or more runners. Each runner may be an individual (e.g., an employee of the financial institution) who carries cash in a portable form to provide a place for a user to withdraw and/or deposit cash. The runner may have a vehicle. The runner may regularly provide its current location to the financial institution using a mobile device. The financial institution may compare the current location of each runner within a certain radius of the location data indicated by the request. In this example, the financial institution may determine that the closest runner (in this example, "Runner 1") is 1 mile from the current location of the user Method 400 may proceed to block 403.

In various embodiments, in block 402, the location data may be compared with locations of runners and mobile ATMs. Also, in block 402 the location data may only be compared with the locations of mobile ATMs based on the amount that the user is seeking to deposit or withdraw.

At block 403, the runner may be contacted based on the results of the comparison. In this example, the financial institution may send an alert to Runner 1. The alert may include the request from the user device. The alert may include the user's current location (e.g., the home address) The alert may query Runner 1 to confirm that he can make it to the user's home and requesting an estimated time. The financial institution may automatically calculate the time it would take for Runner 1 to drive to the user's home, based on the distance between Runner 1 and the user's home, the time of day, the current traffic conditions, the current weather, the type of vehicle, etc. Method 400 may proceed to block 404.

At block 404, a response may be received from Runner 1. The response may be affirmative, indicating that Runner 1 will travel to the user's home where the user can deposit the $60. The response may be negative, indicating that Runner 1 cannot make the trip. If the response is negative, method 400 may return to block 402 and search for another runner nearby. The response may propose a later time for Runner 1 to arrive at the user's home (e.g., if Runner 1 has to make several stops along the way for other customers). In various embodiments, Runner 1 may respond with a proposed alternate location for meeting the user. In this example, Runner 1 may respond affirmatively and accept the request. The financial institution may calculate the estimated time for Runner 1 to arrive at the user's home. Method 400 may proceed to block 405.

At block 405, an alert may be transmitted to the user device. The alert may include a picture of Runner 1, the estimated time of Runner 1's arrival at the user's home, a picture of the vehicle, the license plate number of the vehicle, a map-like interface that allows the user device to see Runner 1's current location, and a messaging interface that allows user device to communicate directly with Runner 1. Method 400 may proceed to block 406.

At block 406, confirmation of the transaction between Runner 1 and the user may be received. In this example, the user may hand Runner 1 the $60 in cash. In response, Runner 1 may transmit a confirmation to the financial institution. The confirmation may be received based on a peer-to-peer transaction between the user device and a device associated with Runner 1 (e.g., RFID, tokenized exchange). In various embodiments, block 406 may comprise the Person2Person payment methods described in, for example, Appendix A.

At block 407, the user's account may be debited or credited based on the exchange in block 406. In this example, an account associated with the user may be credited $60 from a test account associated with the financial institution.

Additional information relevant to this disclosure is found in Appendix A, the disclosure of which is incorporated herein by reference in its entirety.

It is further noted that the software described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A system of one or more network enabled computers, comprising:
   one or more location processors in communication with one or more load balancers;
   a first memory storing first instructions that, when executed, are configured to cause the one or more location processors to:
      receive, from one of the one or more load balancers, a request for a mobile automatic teller-machine (ATM) of a plurality of mobile ATMs received by one of the one or more load balancers from a user device, the request comprising transaction location data indicating a geographic location at which the mobile ATM is requested to meet a user associated with the user device, wherein each mobile ATM of the plurality of mobile ATMs comprise a driverless vehicle;
      receive, for each mobile ATM of the plurality of mobile ATMs, respective ATM location data indicating a respective geographic location of the mobile ATM; and
      determine, based at least in part on a comparison of the transaction location data to the respective ATM location data of the plurality of mobile ATMs, that a geographic location of a first mobile ATM of the plurality of mobile ATMs is a closest mobile ATM, from among the plurality of mobile ATMs, to the geographic location indicated by the transaction location data;
one or more communications processors;
a second memory storing second instructions that, when executed, are configured to cause the one or more communications processors to:
  transmit a first alert to the first mobile ATM; and
  transmit a second alert to the user device, the second alert comprising an estimated time and a proposed alternate geographic location at which the first mobile ATM will arrive at the proposed alternate geographic location for meeting the user associated with the user device, the proposed alternate geographic location differing from the requested geographic meeting location.

2. The system of claim 1, further comprising:
one or more transaction processors; and
a third memory storing third instructions that, when executed, are configured to cause the one or more transaction processors to:
  receive, from the first mobile ATM, confirmation that a transaction was completed, the transaction comprising the first mobile ATM either providing cash to the user associated with the user device or receiving cash from the user associated with the user device.

3. The system of claim 2, wherein the transaction processor receives the confirmation responsive to the first mobile ATM receiving a radio frequency identification signal from the user device to initiate the transaction.

4. The system of claim 1, wherein first instructions, when executed, are further configured to cause the one or more location processors to:
  direct at least one of the plurality of mobile ATMs to a location that is associated with an area of high demand.

5. The system of claim 4, wherein the first instructions, when executed, are further configured to cause the one or more location processors to:
  determine the location associated with the area of high demand based at least in part on one or more past customer requests for mobile ATMs.

6. The system of claim 3, further comprising:
multiple additional computing resources, comprising: a plurality of additional location processors, a plurality of additional transaction processors, and a plurality of additional communication processors; and
one or more load balancers for distributing workloads across the multiple computing resources.

7. A method comprising:
receiving, at a network-enabled computer and from a load balancer, a mobile automatic teller-machine (ATM) request comprising transaction location data indicating a requested geographic meeting location for a mobile ATM to meet a user associated with a user device;
receiving, from each mobile ATM of a plurality of mobile ATMs, respective ATM location data indicating a respective geographic location of the mobile ATM, wherein each mobile ATM of the plurality of mobile ATMs comprise a driverless vehicle;
identifying a closest mobile ATM from among the plurality of mobile ATMs based at least in part on a comparison of the requested geographic meeting location and the respective ATM location data of the plurality of mobile ATMs;
transmitting, from the network-enabled computer, a first alert to the identified closest mobile ATM, the first alert comprising information regarding the mobile ATM request;
receiving, at the network-enabled computer, a response from the identified closest mobile ATM, wherein the response from the identified closest mobile ATM is in reply to the first alert and comprises an estimated time and a proposed alternate geographic location for meeting the user associated with the user device, the proposed alternate geographic location differing from the requested geographic meeting location; and
receiving, at the network-enabled computer and from the identified closest mobile ATM, a confirmation that a transaction was executed with the user device.

8. The method of claim 7, wherein the information regarding the mobile ATM request comprises at least one content element of: the requested geographic meeting location, identification information associated with the user, contact information associated with the user, an account number associated with the user, and an amount of a requested withdrawal or deposit.

9. The method of claim 7, wherein the response from the identified closest mobile ATM comprises at least one response type of: an affirmative response indicating that the identified closest mobile ATM has accepted the request; a negative response indicating that the identified closest mobile ATM has rejected the request; and an alternative response indicating that the identified closest mobile ATM has neither accepted nor rejected the request.

10. The method of claim 9 further comprising searching, by the network-enabled computer and responsive to receiving the negative response from the identified closest mobile ATM, for another mobile ATM to resolve the mobile ATM request.

11. The method of claim 7, wherein the confirmation that the transaction was executed is indicative of either (i) cash being provided to the user associated with the user device or (ii) cash being received from the user associated with the user device.

12. The method of 11, wherein the transaction is executed responsive to the user device transmitting a radio frequency identification signal to the identified closest mobile ATM.

13. A system comprising:
one or more processors in communication with one or more load balancers;
memory in communication with the one or more processors and storing instructions that, when executed, are configured to cause the one or more processors to:
  receive, from one of the one or more load balancers, a mobile automatic teller-machine (ATM) request comprising transaction location data indicating a requested geographic meeting location at which a mobile ATM is requested to meet a user associated with the user device;
  receive, for each mobile ATM of a plurality of mobile ATMs, respective ATM location data indicating a respective geographic location of the mobile ATM, wherein each mobile ATM of the plurality of mobile ATMs comprise a driverless vehicle;
  determine, based at least in part on a comparison of the transaction location data to the respective ATM location data of the plurality of mobile ATMs, that a first mobile ATM of the plurality of mobile ATMs is a closest mobile ATM to the requested geographic meeting location;
  transmit, to the user device, a first alert comprising response data associated with the first mobile ATM, wherein the response data further comprises an alternative response indicating that the mobile ATM has neither accepted nor rejected the request, the alternative response comprising an estimated time and a proposed alternate meeting location for meeting the user associated with the user device, the proposed alternate meeting location differing from the requested geographic meeting location.

14. The system of claim 13, wherein the transaction location data indicating the requested geographic meeting location is determined using at least one information type of: cellular information, Wi-Fi information, Global Positioning System (GPS) information, and application information.

15. The system of claim 14, wherein the transaction location data indicating the requested geographic meeting location is determined from application information, the application information comprising at least one data type of: Core Location framework data, ACCESS_COARSE_LOCATION data, and FINE_strings data.

16. The system of claim 13, wherein the response data associated with the first mobile ATM comprises at least one response type of: an affirmative response indicating that the first mobile ATM has accepted the request; a negative response indicating that the mobile ATM has rejected the request; and an alternative response indicating that the mobile ATM has neither accepted nor rejected the request.

17. The system of claim 16, wherein the response data associated with the first mobile ATM comprises the negative response indicating that the first mobile ATM has rejected the request, the negative response further indicating a continued search for another mobile ATM to resolve the mobile ATM request.

18. The system of claim 16, wherein the response data associated with the first mobile ATM comprises the affirmative response indicating that the first mobile ATM has accepted the request, the affirmative response further comprising an estimated time at which the first mobile ATM will arrive at the requested geographic meeting location.

19. The system of claim 13, further comprising receiving from the mobile ATM an indication that the user completed a transaction with the mobile ATM responsive to the mobile ATM receiving a radio frequency identification signal indicating a transfer of funds between the user device and the mobile ATM.

* * * * *